United States Patent [19]

Baba

[11] Patent Number: 5,112,112
[45] Date of Patent: May 12, 1992

[54] CENTER HUB CAP FOR VEHICLE WHEELS

[75] Inventor: Yuko Baba, Yokohama, Japan

[73] Assignee: Hashimoto Forming Industry Co., Ltd., Japan

[21] Appl. No.: 686,295

[22] Filed: Apr. 16, 1991

Related U.S. Application Data

[63] Continuation of Ser. No. 282,193, Dec. 9, 1988, abandoned.

[30] Foreign Application Priority Data

Dec. 26, 1987 [JP] Japan .................. 62-1987391[U]

[51] Int. Cl.⁵ .................................. B60B 7/08
[52] U.S. Cl. ........................... 301/108 A; 301/37 TP
[58] Field of Search ............... 301/37 P, 37 R, 37 TP, 301/37 PB, 108 R, 108 A, 37 CM

[56] References Cited

U.S. PATENT DOCUMENTS

| | | | |
|---|---|---|---|
| 1,887,611 | 11/1932 | Wittenberg | 301/108 R |
| 4,167,294 | 9/1979 | Okazaki et al. | 301/108 R |
| 4,217,003 | 8/1980 | Main | 301/37 P X |

FOREIGN PATENT DOCUMENTS

| | | | |
|---|---|---|---|
| 2542973 | 4/1977 | Fed. Rep. of Germany | 301/108 R |
| 771691 | 10/1934 | France | 301/108 R |
| 52-39531 | 10/1977 | Japan | |
| 56-168607 | 12/1981 | Japan | |
| 58-172109 | 11/1983 | Japan | |
| 59-49009 | 3/1984 | Japan | |
| 61-89509 | 6/1986 | Japan | |
| 744837 | 2/1956 | United Kingdom | 301/37 PB |
| 2031816 | 4/1980 | United Kingdom | 301/108 R |

Primary Examiner—Russell D. Stormer
Attorney, Agent, or Firm—Stevens, Davis, Miller & Mosher

[57] ABSTRACT

There is disclosed a center hub cap for vehicle wheels, to be mounted on a wheel for covering a center hole therein. The cap is composed of a flexible material and includes a generally disc-like main body and a plurality of integral projections arranged on the rear side of the main body for engagement with the center hole. The main body on its rear surface has an annular wall projecting axially rearwardly therefrom and formed with cutout portions to define the projections. Each projection extends from a location which is remote from the main body, and has a free end in the form of a stepped portion which can be arranged close to the main body. The projection with a sufficient length provides an improved flexibility, and permits the cap to be used in combination with a wheel whose center hole has to be located close to the cap main body.

10 Claims, 3 Drawing Sheets

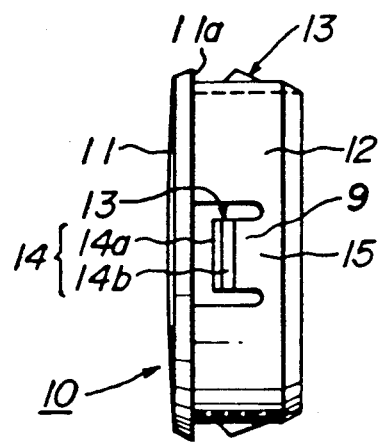
FIG_1
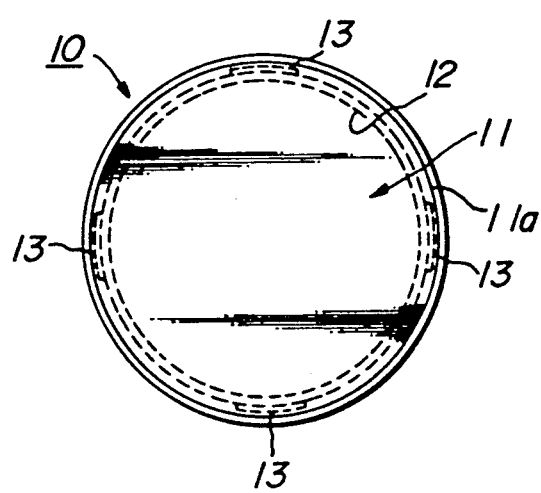
FIG_2
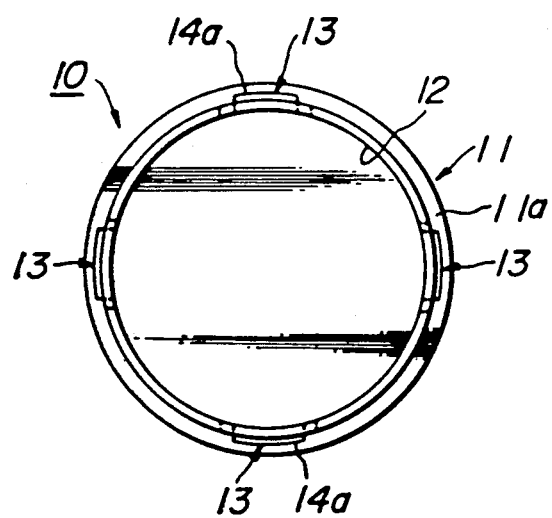
FIG_3
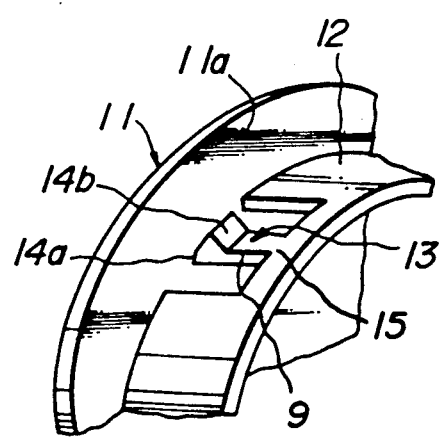
FIG_4

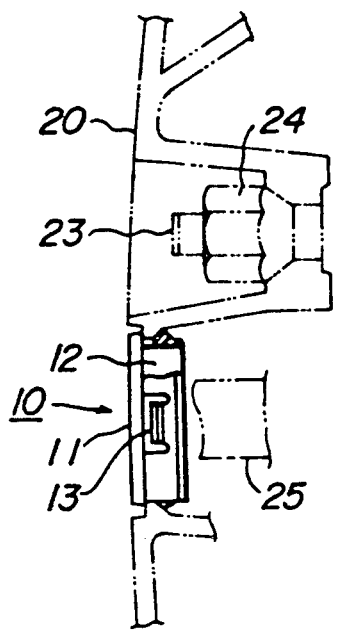
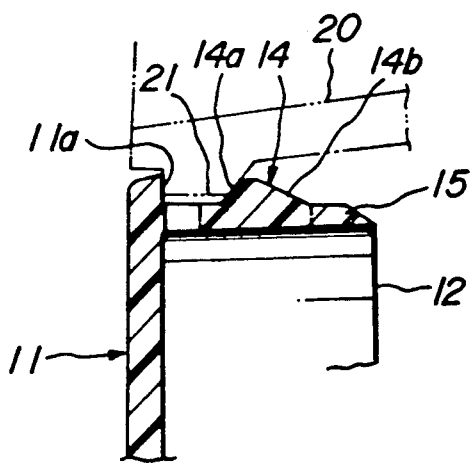
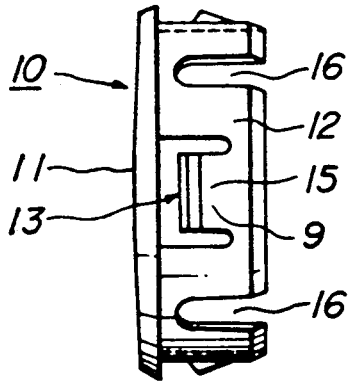
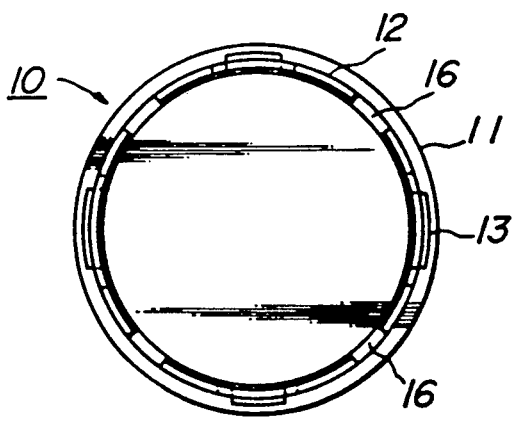
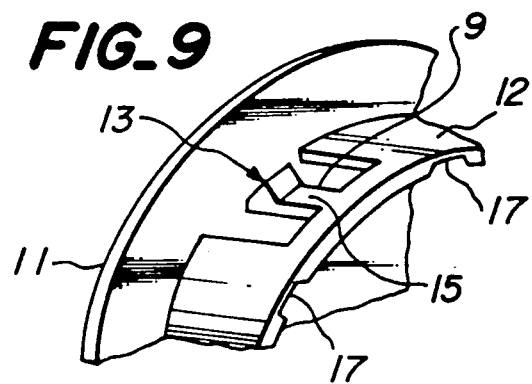

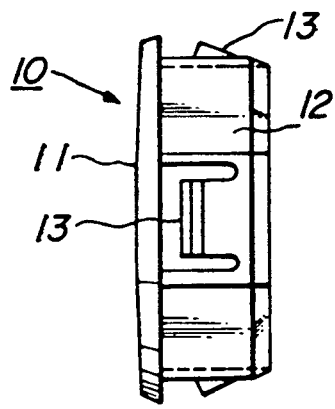
FIG_10
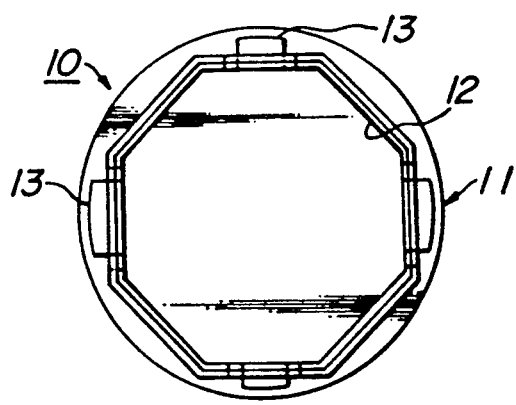
FIG_11
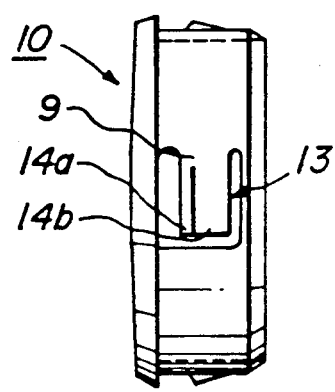
FIG_12
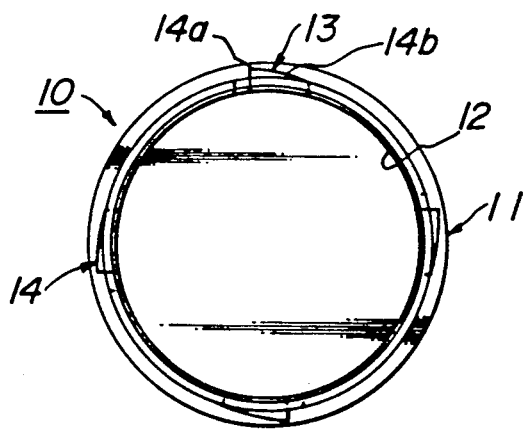
FIG_13
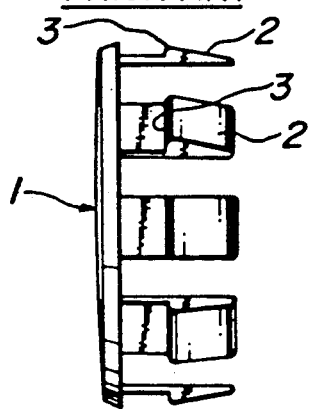
FIG_14
PRIOR ART
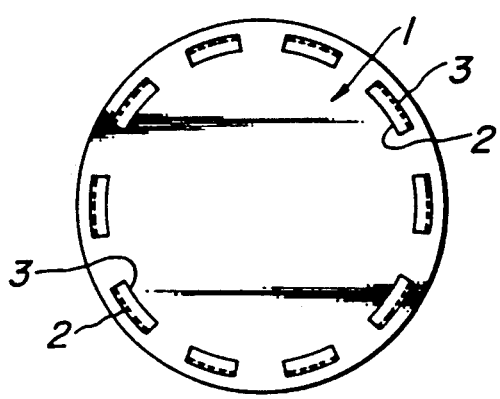
FIG_15
PRIOR ART

CENTER HUB CAP FOR VEHICLE WHEELS

This application is a continuation of application Ser. No. 282,193, filed Dec. 9, 1988, now abandoned.

BACKGROUND OF THE INVENTION

1. Field of the Invention

The present invention relates to an improvement in a center hub cap to be mounted on a vehicle wheel for covering a wheel center hole.

2. Description of the Related Art

There is shown, in FIGS. 14 and 15, a typical example of the center hub cap as mentioned above, which includes a generally disc-like main body 1 composed of a flexible material, such as a thermoplastic synthetic resin. The main body 1 has a plurality of integral hook-like projections 2 arranged on its rear surface so as to project therefrom axially rearwardly. The projections 2 can be resiliently deflected radially inwardly as they are inserted into a center hole in a vehicle wheel to mount the cap thereon. Furthermore, each projection 2 has a free end in the form of a stepped portion 3 which is engageable with the periphery of the center hole on its rear side, so that the cap can be mounted on and retained by the wheel and the wheel center hole is covered by the cap.

In the above-mentioned known arrangement of the center hub cap, the projections 2 extending from the main body 1 should have a substantial length in order to ensure that they can be sufficiently deflected radially inwardly when mounting the cap on the wheel. Thus, such a cap can be used only in combination with a wheel whose center hole is to be located remote from the main body 1 of the cap. In other words, for a wheel having a center hole which is to be located close to the main body 1 of the cap or which is of a small depth, the length of each projection 2 has to be decreased to locate the stepped portion 3 close to the main body 1 of the cap. Then it becomes relatively difficult to achieve a sufficient deflection of the projections 2, and even a small dimensional deviation of the cap itself, or of the wheel center hole, results in that the cap cannot be stably retained by the wheel, and frequency gives rise a tendency of undesirable and often dangerous separation of the cap from the wheel. Moreover, the projections 2 tend to get damaged prematurely since their root end portions in connection with the main body 1 are subjected to a severe bending moment due to the insufficient length or flexibility thereof.

In this context, Japanese Patent Application Publication No. 52-39,531 discloses a vehicle wheel cover which includes a plurality of spring clips mounted on the rear side of the cover to be resiliently engaged with the rim of a wheel. These clips might be incorporated into a center hub cap to thereby permit the cap to be used also in combination with a wheel having a center hole which is of a small depth, or is to be located close to the main body. Nevertheless, use of such clips is disadvantageous as requiring additional and troublesome assembly steps of separate components, and also as resulting in a structural complexity as well as an increased production cost.

SUMMARY OF THE INVENTION

Therefore, an object of the present invention is to provide an improved center hub cap for vehicle wheels, which makes it possible to eliminate or at least mitigate the drawbacks of the conventional arrangement as mentioned above.

Briefly stated, the present invention provides a center hub cap for vehicle wheels, comprising a generally disc-like main body composed of a resilient material, as well as a plurality of hook-like projections which are integral with the main body on its rear side and adapted to engage with the periphery of a wheel center hole to be aligned with an axle of the vehicle. The main body has a rear surface which is provided with an integral annular wall projecting axially rearwardly therefrom. The annular wall includes an outer peripheral surface and an open end on its axially rear side, and is formed with a plurality of cutout portions to define the above-mentioned hook-like projections. Each projection extends from a location which is remote from the main body, and has a free end in the form of a stepped portion which projects radially outwardly beyond the outer peripheral surface of the annular wall, and which is arranged between the rear surface of the main body and the open rear end of the annular wall.

The above-mentioned arrangement of the center hub cap according to the present invention features the provision of hook-like projections each defined by forming cutout portions in the annular wall to extend from a location which is remote from the main body. This makes it readily possible to sufficiently afford a substantial length of the projections, and to thus locate the stepped portions of the projections close to the main body of the center hub cap. Hence, the center hub cap according to the present invention can be used in combination with a wheel having a center hole which is of a small depth or is to be located close to the main body of the cap. Needless to say, the projections with a substantial length ensures that they can be sufficiently deflected without being subjected to a severe bending moment, and that the center hub cap can be stably retained by the wheel despite some deviation in the dimension of the cap itself or of the wheel center hole.

BRIEF DESCRIPTION OF THE DRAWINGS

FIGS. 1, 2 and 3 are a side view, front view and rear view, respectively, of a center hub cap according to one embodiment of the present invention;

FIG. 4 is a fragmentary perspective view showing the center hub cap of FIGS. 1 to 3 in an enlarged scale;

FIG. 5 is a side view showing the manner with which the center hub cap of FIGS. 1 to 3 is mounted on a wheel;

FIG. 6 is a fragmentary sectional view showing a portion of FIG. 5 in an enlarged scale;

FIGS. 7 and 8 are a side view and rear view, respectively, of a center hub cap according to a modified embodiment of the present invention;

FIG. 9 is a fragmentary perspective view of a center hub cap according another embodiment of the present invention;

FIGS. 10 and 11 are a side view and rear view, respectively, of a center hub cap according to a further embodiment of the present invention;

FIGS. 12 and 13 are a side view and rear view, respectively, of a center hub cap according to still another embodiment of the present invention; and FIGS. 14 and 15, already described above, are a side view and rear view, respectively, of one typical example of a conventional center hub cap.

DETAILED DESCRIPTION OF THE PREFERRED EMBODIMENTS

The present invention will be more fully explained hereinafter, by referring to some preferred embodiments as shown in the accompanying drawings. It has to be noted that, throughout the drawings, same reference numerals are used to denote the same or equivalent elements.

A first embodiment of the center hub cap 10 according to the present invention is shown in FIGS. 1 to 4, which as a whole is composed essentially of a thermoplastic synthetic resin with sufficient heat resistivity and flexibility, such as glass-fiber reinforced polyamide resin, modified polyphenyleneoxide (PPO) resin, or the like. The cap 10 includes a main body 11 of generally disc-like configuration, and an annular cylindrical wall 12 which is formed on the rear surface of the main body 11 to project therefrom axially rearwardly and terminate in an open rear end. The cylindrical wall 12 is arranged coaxially with the main body 11, leaving a flange-like abutment 11a on the rear surface of the main body 11. The cylindrical wall 12 is formed with a plurality of cutout portions therein, to thereby circumscribe a plurality of resilient hook-like projections 13 which are spaced from each other in the circumferential direction of the wall 12 by a predetermined angular distance.

The present invention is to provide a novel arrangement of the resilient hook-like projections 13. More particularly, as shown in FIGS. 4 and 6, each projection 13 has a free end 14 in the form of a stepped portion defined by a pair of inclined surfaces 14a, 14b. The first inclined surface 14a is arranged opposite to, and in the vicinity of the main body 11, and is adapted to engage with a vehicle wheel 20 on the rear side of its center hole 21 such that the center cap 10 is retained by the wheel 20. The first inclined surface 14a has thus an inclination angle which corresponds to the inclination of the rear side of the wheel center hole 21. The second inclined surface 14b, in turn, is arranged adjacent to the first inclined surface 14a and remote from the main body 11, and is adapted to engage with the front side of the wheel center hole 21 when mounting the hub cap 10 onto the wheel 20. The second inclined surface 14b has thus an inclination oriented in the opposite sense to that of the first inclined surface 14a. The stepped free end 14 of each projection 13 protrudes radially outwardly beyond the outer peripheral surface of the cylindrical wall 12. Furthermore, each projection 13 has its root end portion 15 arranged in the vicinity of the open rear end of the cylindrical wall 12. This means that the root end portion 15 of the projection 13 is spaced from the main body 11 by arm 9 so that the projection 13 has a sufficient length to provide an improved flexibility.

The center hub cap 10 according to the present invention is to be mounted on a vehicle wheel 20 as shown in FIG. 5, including a rim 22 which is secured to a hub (not shown) of the vehicle by a plurality of bolts 23 and nuts 24, with the center hole 21 being brought into an coaxial alignment with an axle 25.

In order to mount the center hub cap 10 onto the wheel 20, the cap 10 is positioned relative to the wheel 20 such that the second inclined surface 14b of each projection 13, which is directed axially rearwardly, is brought into contact with the front side of the wheel center hole 21. The cap 10 is then inserted into the center hole 21 from the open rear end of the cylindrical wall 12, maintaining the inclined surface 14b of each free end 14 in sliding contact with the front side of the wheel center hole 21, thereby to gradually deflect the free end 14 radially inwardly. At this occasion, the projections 13 having a sufficient length and an improved flexibility, as mentioned above, can be readily and sufficiently deflected without being subjected to a severe bending moment.

By further inserting the cap 10 into the wheel center hole 21, the free end 14 of each projection 13 can be passed through the center hole 21 while maintaining its sliding contact with and along the inner periphery of the hole 21. Thus, the abutment 11a on the rear surface of the main body 11 comes into engagement with the front side of the center hole 21 while the free end 14 of each projection 13 is disengaged from the inner periphery of the center hole 21. The free end 14 of each projection 13 is then resiliently restored into its original shape, so that the inclined surface 14a is brought into engagement with the rear side of the center hole 21.

The center hub cap 10 according to the present invention is mounted on the wheel 20 in the manner described above, with the periphery of the center hole 21 being tightly clamped by, and between, the abutment 11a of the cap main body 11 and the inclined surface 14a of the stepped end 14 of each projection 13. This ensures that the hub cap 10 can be stably retained by the wheel 20 even when there is a slight dimensional deviation of the cap 10 itself, or of the center hole 21 in the wheel 20.

According to a modified embodiment of the present invention, a further improved flexibility of the projections 13 can be readily realized by the annular wall 12 whose open rear end itself is flexible with respect to the cap main body 11. To this end, as shown in FIGS. 7 and 8, the annular wall 12 of the hub cap 10 may have a plurality of slits 16 extending on both sides of each projection 13, axially from the open rear end of the wall 12 toward the main body 11. These slits 16 may be replaced by a plurality of grooves 17 as shown in FIG. 9, which can be formed e.g. by locally removing material from the wall 12 to extend on both sides of each projection 13, axially from the open rear end of the wall 12 toward the main body 11.

The center hub cap 10 according to the present intention may include an annular wall 12 with a regular polygonal cross-sectional contour, such as a regular octagonal contour as shown in FIGS. 10 and 11. The annular wall 12 of the hub cap 10 may be formed with projections 13 each extending in the circumferential direction, and having the outer surface which is gradually raised radially outwardly toward the free end 14, as shown in FIGS. 12 and 13. In the latter case, it is possible to afford the projections 13 with a sufficient length, without being limited to the axial length of the annular wall 12. Furthermore, when the hub cap 10 of the present invention is to be used in combination with a wheel having a smaller dimensional tolerance of the center hole, the center cap 10 can be stably retained by the wheel without requiring the rear side of the center hole to be inclined relative to the center axis of the wheel. It is of course that, in these modifications also, the annular wall 12 may be formed with slits 16 or grooves 17 so as to further improve the flexibility of the root end portion of the projection.

It will be readily appreciated from the foregoing description that, in accordance with the present invention, each hook-like projection circumscribed by forming cutout portions in the annular wall extends from a location which is remote from the man body. It is thus possible to sufficiently afford the projections with a substantial length, and to locate the stepped end portion of each projection close to, and in the vicinity of the center cap main body.

Accordingly, the center cap of the present invention can be used in combination with a wheel having a center hole which is of a small depth or is to be located close to the main body of the cap. Moreover, provision of the projections with a substantial length ensures that they can be sufficiently deflected radially inwardly, without being subjected to damage due to a severe bending moment, and that the center cap can be stably retained by a wheel without substantial influence of the dimensional tolerance of the cap itself, or of the center hole in the wheel.

What is claimed is:

1. A center hub cap for vehicle wheels, comprising a generally disc-like main body composed of a resilient thermoplastic synthetic resin material, said main body having a rear surface which is provided with an integral annular wall projecting axially rearwardly from said rear surface to terminate in an open rear end, said annular wall being flexible in relation to said main body; a plurality of hook-like projections formed integrally with said annular wall and adapted to engage with the periphery of a center hole of a wheel upon which the hub cap is mounted, said hub cap to be aligned with an axle of the vehicle, said annular wall having an outer peripheral surface, and a plurality of cutout portions for defining said hook-like projections therein, each projection having a free end in the form of a stepped portion which projects radially outwardly beyond said outer peripheral surface of the annular wall and a root end portion connected to said free end portion by an arm, said hook-like projections being integrally connected to said annular wall solely at said root end portion, said free end being separated from said cutout portions of said annular wall and said rear surface of said disc-like main body, said arm and said free end portion being in the form of a resilient cantilever, said arm lying generally in the same curve as said annular wall, the length of said resilient cantilever permitting a reduced deflection per unit length due to an increased effective length of the hook-like projections to reduce the bending moment, said hook-like projections being arranged between said rear surface of the main body said open rear end of the annular wall said annular wall being formed with a pair of slits which are circumferentially spaced from each other on both sides of each projection, and which extend axially forwardly from said rear end of the annular wall toward said main body.

2. The center hub cap as claimed in claim 1, wherein each projection extends axially forwardly from a location close to said rear end of the annular wall and toward said main body.

3. The center hub cap as claimed in claim 1, wherein each projection extends circumferentially of said annular wall.

4. The center hub cap as claimed in claim 3, wherein each projection has a length as measured circumferentially of said annular wall, which is greater than the axial length of said annular wall.

5. A center hub cap for vehicle wheels, comprising a generally disc-like main body composed of a resilient thermoplastic synthetic resin material, said main body having a rear surface which is provided with an integral annular wall projecting axially rearwardly from said rear surface to terminate in an open rear end, said annular wall being flexible in relation to said main body; a plurality of hook-like projections formed integrally with said annular wall and adapted to engage with the periphery of a center hole of a wheel upon which the hub cap is mounted, said hub cap to be aligned with an axle of the vehicle, said annular wall having an outer peripheral surface, and a plurality of cutout portions for defining said hook-like projections therein, each projections having a free end in the form of a stepped portion which projects radially outwardly beyond said outer peripheral surface of the annular wall and a root end portion connected to said free end portion by an arm, said hook-like projections being integrally connected to said annular wall solely at said root end portion, said free end being separated from said cutout portion of said annular wall and said rear surface of said disc-like main body, said arm and said free end portion being in the form of a resilient cantilever, said arm lying generally in the same curve as said annular wall, the length of said resilient cantilever permitting a reduced deflection per unit length due to an increased effective length of the hook-like projections to reduce the bending moment, said hook-like projections being arranged between said rear surface of the main body and said open rear end of the annular wall, said annular wall being formed with a pair of recesses which are circumferentially spaced from each other in both sides of each projection, and which extend axially forwardly from said rear end of the annular wall toward said main body.

6. The center hub cap as claimed in claim 5, wherein each projection extends axially forwardly from a location close to said rear end of the annular wall and toward said main body.

7. The center hub cap as claimed in claim 5, wherein each projection extends circumferentially of said annular wall.

8. A center hub cap for vehicle wheels, comprising a generally disc-like main body composed of a resilient thermoplastic synthetic resin material, said main body having a rear surface which is provided with an integral annular wall projecting axially rearwardly from said rear surface to terminate in an open rear end, said annular wall being flexible in relation to said main body; a plurality of hook-like projections formed integrally with said annular wall and adapted to engage with the periphery of a center hole of a wheel upon which the hub cap is mounted, said hub cap to be aligned with an axle of the vehicle, said annular wall having an outer peripheral surface, and a plurality of cutout portions for defining said hook-like projections therein, each projection having a free end in the form of a stepped portion which projects radially outwardly beyond said outer peripheral surface of the annular wall and a root end portion connected to said free end portion by an arm, said hook-like projections being integrally connected to said annular wall solely at said root end portion, said free end being separated from said cutout portions of said annular wall and said rear surface of said disc-like main body, said arm and said free end portion being in the form of a resilient cantilever, said arm lying generally in the same curve as said annular wall, the length of said resilient cantilever permitting a reduced deflection per unit length due to an increased effective length of the hook-like projections to reduce the bending moment, said hook-like projections being arranged between said rear surface of the main body and said open rear end of the annular wall and the cutout portions being substantially U shaped with the two legs of the U extending along side edges of the hook-like projections and the bight of the U extending along the free ends of the projections.

9. The center hub cap of claim 8 in which the two legs of each U shaped cutout extend in an axial direction.

10. The center hub cap of claim 8 in which the two legs of each U shaped cutout extend in the circumferential direction of said annular wall.

* * * * *